United States Patent
Robinson et al.

(10) Patent No.: US 11,668,230 B2
(45) Date of Patent: Jun. 6, 2023

(54) ANNULAR DISK FOR TURBOCHARGER SPEED CONTROL

(71) Applicant: Caterpillar Inc., Peoria, IL (US)

(72) Inventors: Aaron Luke Robinson, Lafayette, IN (US); Jonathan P. Kilkenny, Peoria, IL (US); Nathan Atterberry, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 67 days.

(21) Appl. No.: 17/248,516

(22) Filed: Jan. 28, 2021

(65) Prior Publication Data

US 2022/0235695 A1 Jul. 28, 2022

(51) Int. Cl.
*F02B 37/22* (2006.01)

(52) U.S. Cl.
CPC .......... *F02B 37/22* (2013.01); *F02D 2250/34* (2013.01)

(58) Field of Classification Search
CPC ....... F02B 37/22; F02D 2250/34; Y02T 10/12
See application file for complete search history.

(56) References Cited

U.S. PATENT DOCUMENTS

| | | | | |
|---|---|---|---|---|
| 4,804,316 A | * | 2/1989 | Fleury | F01D 17/165 415/164 |
| 6,020,652 A | * | 2/2000 | Daudel | F02B 37/24 290/45 |
| 6,368,078 B1 | * | 4/2002 | Palumbo | F02C 6/12 415/206 |
| 8,387,243 B2 | | 3/2013 | An et al. | |
| 8,544,267 B2 | | 10/2013 | Danielewicz et al. | |
| 8,794,588 B1 | | 8/2014 | Jorgensen | |
| 9,016,061 B2 | | 4/2015 | Gunkel et al. | |
| 2003/0170116 A1 | * | 9/2003 | Knauer | F02B 37/24 415/160 |
| 2013/0129486 A1 | * | 5/2013 | Lombard | F01D 17/141 415/145 |
| 2017/0089255 A1 | * | 3/2017 | Freisinger | F02B 37/025 |
| 2020/0240330 A1 | * | 7/2020 | Christensen | F01D 15/10 |

FOREIGN PATENT DOCUMENTS

| | | | |
|---|---|---|---|
| DE | 102004031807 A1 | 1/2006 | |
| DE | 102008039508 A1 * | 2/2010 | ............ F01D 11/003 |
| DE | 102014102038 B4 | 11/2016 | |

(Continued)

*Primary Examiner* — Joseph J Dallo
(74) *Attorney, Agent, or Firm* — Harrity & Harrity, LLP

(57) ABSTRACT

An annular disk comprises a front surface, a rear surface, an outer surface, and an inner surface. The front surface has a front opening within a front plane. The rear surface has a rear opening within a rear plane. The rear opening, which has a diameter that is smaller than a diameter of the front opening, communicates with the front opening to define a bore for guiding an exhaust stream flowing from a turbocharger to an exhaust outlet. The outer surface connects the front surface to the rear surface and includes an outer angled portion, an outer radial portion, and an outer axial portion. The inner surface includes an inner angled portion, an inner axial portion, and an inner radial portion extending between the inner angled portion and the inner axial portion. The inner radial portion is configured to obstruct a portion of the exhaust stream to increase back pressure.

20 Claims, 4 Drawing Sheets

(56) References Cited

FOREIGN PATENT DOCUMENTS

| GB | 2552060 B | 3/2020 | |
|---|---|---|---|
| WO | WO-9918334 A1 * | 4/1999 | ............... F01N 1/08 |
| WO | WO-2005119882 A1 * | 12/2005 | .............. F02B 37/10 |
| WO | WO-2007022926 A1 * | 3/2007 | ............. B01D 53/90 |
| WO | WO-2008090273 A2 * | 7/2008 | ................ F01L 3/20 |
| WO | WO-2010106045 A1 * | 9/2010 | ........... F01D 25/285 |
| WO | 2015140388 A1 | 9/2015 | |
| WO | 2015165576 A1 | 11/2015 | |

* cited by examiner

ANNULAR DISK FOR TURBOCHARGER SPEED CONTROL

TECHNICAL FIELD

The present disclosure relates generally to turbocharger speed control and, for example, to an annular disk for turbocharger speed control.

BACKGROUND

A turbocharger includes a turbine wheel and a compressor wheel. The turbine wheel is rotated by an exhaust stream from an engine. The compressor wheel, which co-rotates with the turbine wheel, draws in and compresses air traveling to the engine. As a result, the turbine wheel and the compressor wheel work together to increase an amount of air and fuel entering the engine, thereby increasing engine efficiency and/or power output. Under certain conditions, however, a rotational speed of the turbine wheel and the compressor wheel may exceed a threshold value (e.g., in a range of approximately 80,000 revolutions per minute (rpm) to approximately 200,000 rpm). For example, in high altitudes, the turbine wheel and the compressor wheel may rotate at a higher speed due to reduced air density. As a result, one or more components of the turbocharger may become fractured or otherwise damaged. Additionally, in some cases, the turbocharger may overboost the engine, resulting in damage to internal components of the engine and potentially complete engine failure.

WO 2015/140388 discloses an exhaust duct arrangement. The exhaust duct arrangement comprises a first exhaust duct part having a flange for connecting a second end of the part to an adjacent duct part, and a second exhaust duct part having a first flange at a first end and a second flange at a second end, each of the flanges being arrangeable against a flange of an adjacent exhaust duct part. The flanges of the exhaust duct parts are configured so that when the first end of the second exhaust duct part is arranged against the flange of the first exhaust duct part, the joint that is formed has a different cross-sectional profile than a joint that is formed by arranging the second end of the second exhaust duct part against the flange of the first exhaust duct part.

The annular disk of the present disclosure solves one or more of the problems set forth above and/or other problems in the art.

SUMMARY

In some implementations, an annular disk for controlling speed of a turbocharger includes a front surface having a front opening within a front plane; a rear surface having a rear opening within a rear plane that is substantially parallel to the front plane, wherein the rear opening has a diameter that is smaller than a diameter of the front opening, and the rear opening fluidly communicates with the front opening to define a bore for guiding an exhaust stream flowing from the turbocharger to an exhaust outlet; an outer surface that connects the front surface to the rear surface, the outer surface including: an outer angled portion, an outer radial portion, and an outer axial portion extending between the outer angled portion and the outer radial portion; and an inner surface that connects the front surface to the rear surface, the inner surface including: an inner angled portion, an inner axial portion, and an inner radial portion extending between the inner angled portion and the inner axial portion and configured to obstruct a portion of the exhaust stream to increase back pressure.

In some implementations, a system comprises a turbocharger having a compressor wheel, a turbine wheel, and a shaft connecting the compressor wheel to the turbine wheel; and an annular disk extending into an exhaust passageway in a position downstream from the turbine wheel of the turbocharger, wherein the annular disk is configured to induce back pressure in an exhaust stream in a range of approximately 14 kilopascals to approximately 15 kilopascals.

In some implementations, a method of assembling a system includes providing an exhaust collector, the exhaust collector including: a wall including an inlet end and an outlet end that is opposite the inlet end, wherein the inlet end includes an inlet, and the outlet end includes an outlet that fluidly communicates with the inlet to define an exhaust channel; and a flange circumferentially extending around the inlet end of the wall; providing an annular disk, the annular disk having a radially inward section and a radially outward section; and attaching the radially outward section of the annular disk to the flange of the exhaust collector.

DETAILED DESCRIPTION

This disclosure relates to an annular disk, which is applicable to any system or machine utilizing a turbocharger. For example, the system may be an exhaust system, a power system, and/or the like. The machine may be a transportation machine (e.g., a motor vehicle, a railed vehicle, a watercraft, and/or an aircraft), a generator, or another type of machine.

To simplify the explanation below, the same reference numbers may be used to denote like features. The drawings may not be to scale.

Figure 1:
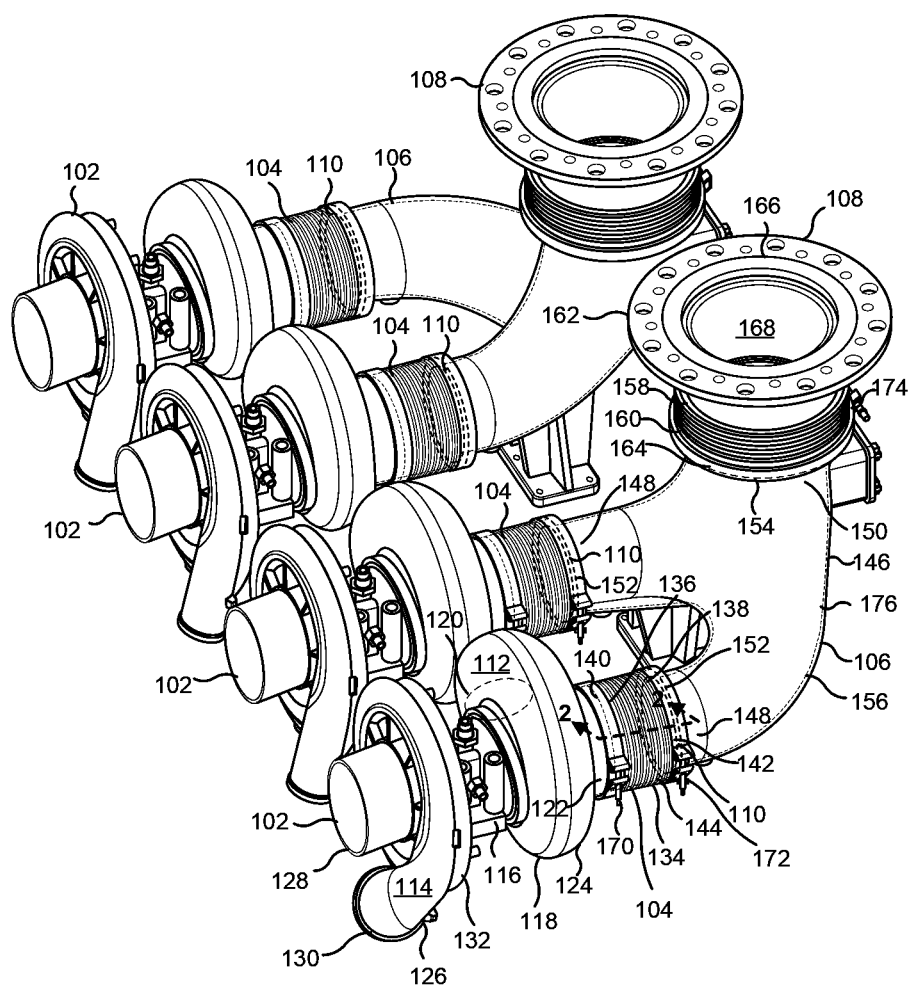
FIG. 1 is an isometric view of an exemplary system described herein.

FIG. 1 depicts an exemplary system 100 of the present disclosure. As shown in FIG. 1, the system 100 includes a plurality of turbochargers 102, a plurality of bellows 104, a pair of exhaust collectors 106, a pair of exhaust ducts 108, and a plurality of annular disks 110 (shown in dotted lines). To simplify explanation, the structure and functionality of a single turbocharger 102, bellows 104, exhaust collector 106, exhaust duct 108, and annular disk 110 will be described. However, it should be understood that the described structure and functionality is respectively applicable to each of the plurality of turbochargers 102, the plurality of bellows 104, the pair of exhaust collectors 106, the pair of exhaust ducts 108, and the plurality of annular disks 110.

The turbocharger 102 is a device that converts thermal energy from an exhaust stream into kinetic energy. The turbocharger 102 includes a turbine 112, a compressor 114, and a central component 116 that connects the compressor 114 to the turbine 112. The turbine 112 includes a turbine housing 118 and a turbine wheel (not shown) housed therein. The turbine housing 118 includes an exhaust inlet 120 that fluidly communicates with an exhaust outlet 122 via a volute 124. The turbine wheel is rotatably secured within the turbine housing 118 at a position interior to and facing the exhaust outlet 122. The compressor 114 includes a compressor housing 126 and a compressor wheel (not shown) housed therein. The compressor housing 126 includes an air inlet 128 and an air outlet 130 that fluidly communicates with the air inlet 128 via a diffuser 132. The compressor wheel is rotatably secured within the compressor housing 126 at a position interior to and facing the air inlet 128. The central component 116 houses a shaft (not shown) that fixedly connects the turbine wheel to the compressor wheel so that the turbine wheel and the compressor wheel co-rotate. In some implementations, the central component 116 may include a motor (e.g., an induction motor, a permanent magnet motor, or another type of motor) to further assist rotation of the turbine wheel and the compressor wheel as needed.

The bellows 104, the exhaust collector 106, and the exhaust duct 108 are conduits that connect together to guide the exhaust stream. The bellows 104, which is substantially cylindrical, includes a flexible wall 134 having a first end 136 and a second end 138 that is opposite to the first end 136. The first end 136 includes a first opening 140, and the second end 138 includes a second opening 142 that fluidly communicates with the first opening 140 to define a hollow interior 144. The exhaust collector 106, which is substantially Y-shaped, includes a wall 146 that converges from a pair of inlet ends 148 to an outlet end 150. The pair of inlet ends 148 respectively include inlets 152, and the outlet end 150 includes an outlet 154 that fluidly communicates with the inlets 152 to define a channel 156. The exhaust duct 108, which is substantially cylindrical, includes a wall 158 having bottom end 160 and a top end 162 that is opposite to the bottom end 160. The bottom end 160 includes a bottom opening 164, and the top end 162 includes a top opening 166 that fluidly communicates with the bottom opening 164 to define a through hole 168.

The exhaust outlet 122 of the turbocharger 102 is attached to the first end 136 of the bellows 104 via a first clamp 170. The second end 138 of the bellows 104 is attached to one of the inlet ends 148 of the exhaust collector 106 via a second clamp 172. The outlet end 150 of the exhaust collector 106 is attached to the bottom end 160 of the exhaust duct 108 via a third clamp 174. The first clamp 170, the second clamp 172, and the third clamp 174, as shown, are v-band clamps. However, other types of attachment mechanisms are contemplated (e.g., pipe clamps, bolts, screws, nuts, solder, and/or a combination thereof). As combined, the hollow interior 144 of the bellows 104, the channel 156 of the exhaust collector 106, and the through hole 168 of the exhaust duct 108 define an exhaust passageway 176.

Figure 2:
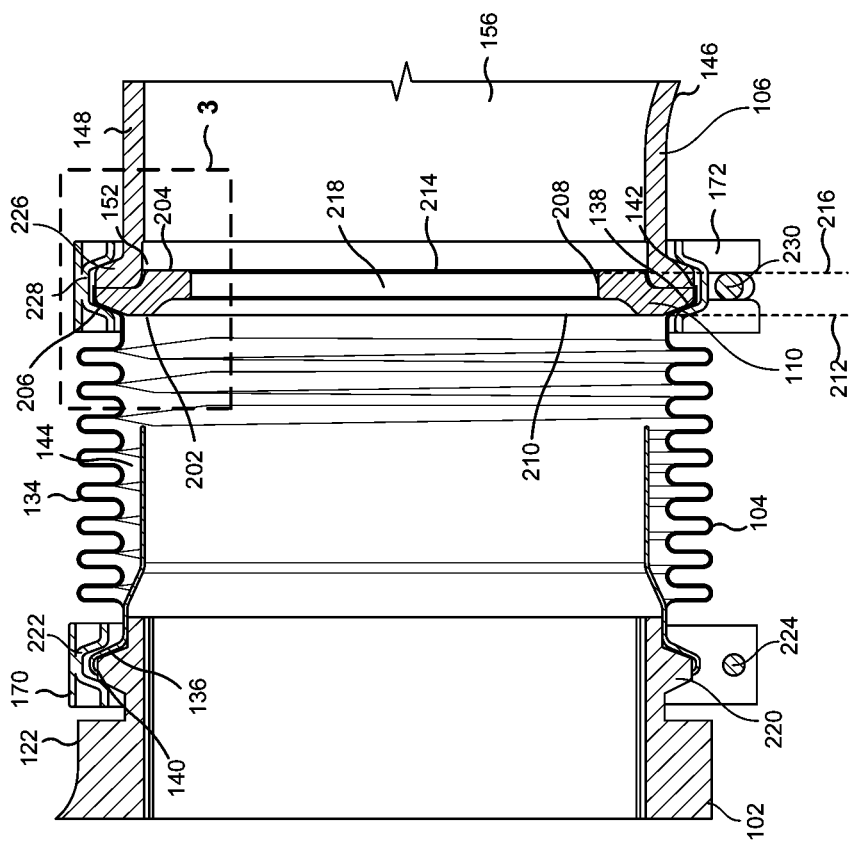
FIG. 2 is a cross sectional view of an annular disk within the system, taken along lines 2-2 of FIG. 1.
Figure 3:
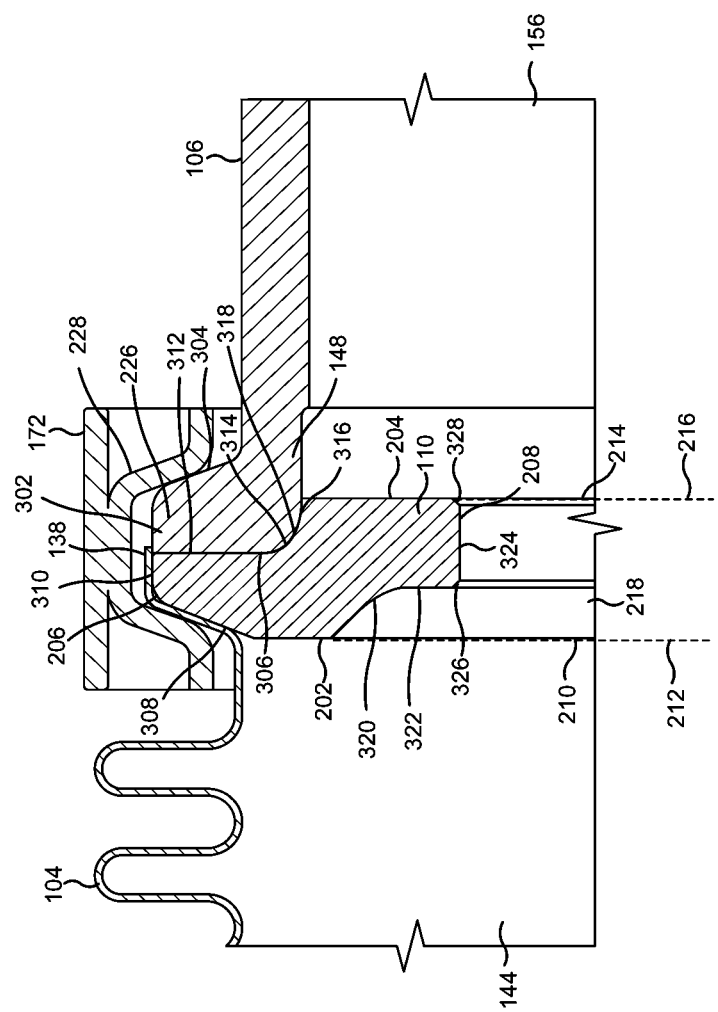
FIG. 3 is an enlarged cross-sectional view of portion 3 of FIG. 2.

The annular disk 110, as will be described below in connection with FIGS. 2-3, is a device that is configured to restrict a flow path of the exhaust stream to thereby induce back pressure within the exhaust passageway 176. While the annular disk 110, as shown, is secured between the second end 138 of the bellows 104 and one of the inlet ends 148 of the exhaust collector 106, other attachment locations are contemplated. For example, the annular disk 110 may be attached within or integrally formed with a different portion of the exhaust passageway 176 or another component downstream of the turbocharger 102.

In use, the exhaust stream from an engine (not shown) enters the exhaust inlet 120 of the turbocharger 102 and flows through the volute 124, which is configured to increase velocity of the exhaust stream. As the exhaust stream flows through the volute 124, the exhaust stream pushes blades of the turbine wheel, causing the turbine wheel to rotate. Because the turbine wheel is connected to the compressor wheel, the compressor wheel rotates therewith, and in so doing, draws in air from the environment into the air inlet 128. The air then travels in a spiral path through the diffuser 132, which increases pressure of the air, and exits the air outlet 130 in a compressed state. After the air is expelled from the compressor, the air enters the engine, which creates a power boost. In the meantime, some portions of the exhaust stream may be recirculated through the engine, while other portions of the exhaust stream are expelled into the bellows 104 via the exhaust outlet 122. The bellows 104, the exhaust collector 106, and the exhaust duct 108 are structured and arranged to produce a scavenging effect in the exhaust stream, which improves efficiency of the engine.

In certain conditions (e.g., high altitudes), the turbine wheel and the compressor wheel may rotate at a rate that exceeds a threshold level (e.g., in a range of approximately 80,000 rpm to approximately 200,000 rpm). As structured, the annular disk 110 is configured to induce a back pressure in a range of approximately 14 kilopascals (kPA) to approximately 15 kPA. By inducing back pressure at such a level within the bellows 104, the annular disk 110 decreases the pressure differential between the turbocharger 102 and the bellows 104, which prevents the speed of the turbine wheel and the compressor wheel from reaching the threshold level.

As indicated above, FIG. 1 is provided as an example. Other examples may differ from what is described with regard to FIG. 1. For example, the number and arrangement of components may differ from that shown in FIG. 1 (e.g., the plurality of turbochargers 102, the plurality of bellows 104, the pair of exhaust collectors 106, the pair of exhaust ducts 108, the plurality of annular disks 110, and/or the v-band clamps). Thus, there may be additional components, fewer components, different components, differently shaped components, differently sized components, and/or differently arranged components than those shown in FIG. 1.

FIG. 2 depicts the annular disk 110 within the exhaust passageway 176 of the system 100. The annular disk 110 includes a front surface 202, a rear surface 204 that is opposite the front surface 202, an outer surface 206 that connects the front surface 202 to the rear surface 204, and an inner surface 208 that is opposite the outer surface 206. The front surface 202 includes a front opening 210 within a front plane 212. The rear surface 204 includes a rear opening 214 within a rear plane 216 that is substantially parallel to the front plane 212. The rear opening 214 fluidly communicates with the front opening 210 to define a bore 218 for guiding the exhaust stream flowing from the turbocharger 102. To restrict flow of the exhaust stream, the rear opening 214 has a diameter that is smaller than a diameter of the front opening 210. Details of the outer surface 206 and the inner surface 208 will be described below in connection with FIG. 3.

As indicated above, the turbocharger 102 is connected to the bellows 104 via the first clamp 170. To connect the turbocharger 102 and the bellows 104, the turbocharger 102 includes a first flange 220 that extends circumferentially around the exhaust outlet 122. The first clamp 170 includes a first annular retainer 222 and a first latch mechanism 224 that is configured to tighten the first annular retainer 222 (e.g., by reducing a size of a diameter of the first annular retainer 222). The first annular retainer 222 has an internal shape that substantially matches a shape of the first flange 220. For example, the internal shape of the first annular retainer 222 and the shape of the first flange 220 may be substantially trapezoidal. To secure the turbocharger 102 to the bellows 104, the first end 136 of the bellows 104 is clamped between the first annular retainer 222 and the first flange 220. As a result, the first end 136 of the bellows 104 is at least partially conformed to the shape of the first flange 220.

As further indicated above, the bellows 104 is connected to the annular disk 110 and the exhaust collector 106 via the second clamp 172. To connect the bellows 104, the annular disk 110, and the exhaust collector 106, the exhaust collector 106 includes a second flange 226 extending circumferentially around the inlet end 148. The second clamp 172 includes a second annular retainer 228 and a second latch mechanism 230 that is configured to tighten the second annular retainer 228 (e.g., by reducing a size of a diameter of the second annular retainer 228). The second annular retainer 228 has an internal shape that substantially matches a combined exterior shape of the annular disk 110 and the second flange 226. For example, the internal shape of the second annular retainer 228 and the combined exterior shape of the annular disk 110 and the second flange 226 may be substantially trapezoidal. To secure the annular disk 110 between the bellows 104 and the exhaust collector 106, the annular disk 110 is placed against the inlet end 148 of the exhaust collector 106, and the second end 138 of the bellows 104 is clamped between the second annular retainer 228 and the outer surface 206 of the annular disk 110. As a result, the second end 138 of the bellows 104 is at least partially conformed to the combined exterior shape of the annular disk 110 and the second flange 226, and the annular disk 110 is clamped between the second end 138 of the bellows 104 and the inlet end 148 of the exhaust collector 106.

As indicated above, FIG. 2 is provided as an example. Other examples may differ from what is described with regard to FIG. 2. For example, the number and arrangement of components from that shown in FIG. 2. Thus, there may be additional components, fewer components, different components, differently shaped components, differently sized components, and/or differently arranged components than those shown in FIG. 2.

FIG. 3 depicts an enlarged view of the annular disk 110 clamped between the bellows 104 and the exhaust collector 106. As indicated above in connection with FIG. 2, the exhaust collector 106 includes the second flange 226 at the inlet end 148. Together, the second flange 226 and the inlet end 148 form an attachment structure 302. The attachment structure 302 includes a clamping surface 304 and a mating surface 306 that is opposite the clamping surface 304.

The outer surface 206 of the annular disk 110 includes an outer angled portion 308, a first outer axial portion 310, an outer radial portion 312, an outer curved portion 314, and a second outer axial portion 316. The outer angled portion 308 connects the front surface 202 to the first outer axial portion 310. The outer angled portion 308 extends at an angle toward the rear plane 216, and the first outer axial portion 310 extends in a direction that is substantially perpendicular to the front plane 212. In order to securely clamp the second end 138 of the bellows 104 against the second annular retainer 228, the angle of the outer angled portion 308 is substantially equal to an angle of the second annular retainer 228. For example, the angle, relative to the front plane 212, may be in a range of approximately 10 degrees to approximately 20 degrees. Together, the outer angled portion 308 and the first outer axial portion 310 substantially mirror the clamping surface 304 of the attachment structure 302. Thus, when in alignment, the outer angled portion 308, the first outer axial portion 310, and the clamping surface 304 form the combined exterior shape as described above.

The outer radial portion 312, which is substantially parallel to the front plane 212, connects the first outer axial portion 310 to the outer curved portion 314, which is concave. The second outer axial portion 316, which is substantially parallel to the first outer axial portion 310, connects the outer curved portion 314 to the rear surface 204. Together, the outer radial portion 312, the outer curved portion 314, and the second outer axial portion 316 define a seat 318 that is configured to receive the mating surface 306 of the attachment structure 302. In order for the seat 318 to be substantially complimentary to the mating surface 306, which allows the annular disk 110 to be immovably clamped against the exhaust collector 106, a radius of curvature of the outer curved portion 314 is substantially equal to a radius of curvature of a convex portion of the mating surface 306.

The inner surface 208 of the annular disk 110 includes an inner angled portion 320, an inner radial portion 322, and an inner axial portion 324. The inner angled portion 320, which extends at an angle toward the rear plane 216, connects the front surface 202 to the inner radial portion 322, which is substantially parallel to the front plane 212. The inner angled portion 320 and the inner radial portion 322 are configured to obstruct a portion of the exhaust stream to increase back pressure within the bellows 104. The inner axial portion 324 extends between the inner radial portion 322 and the rear surface 204 in a direction that is substantially perpendicular to the front plane 212. In some implementations, in order to increase durability of the annular disk 110, the inner surface 208 may further include a first chamfer 326 and a second chamfer 328. The first chamfer 326 may connect the inner radial portion 322 to the inner axial portion 324, and the second chamfer 328 may connect the inner axial portion 324 to the rear surface 204.

The annular disk 110 may be made of a single, integral piece of a ductile metal, such as iron. In order for the annular disk 110 to withstand forces from the exhaust stream, an axial distance between the front surface 202 and the outer radial portion 312 is substantially equal to an axial distance between the inner radial portion 322 and the rear surface 204. In other words, a thickness of the annular disk 110 is generally constant. In order for the annular disk 110 to fit between the bellows 104 and the exhaust collector 106 while also increasing the back pressure, an axial distance between the front surface 202 and the rear surface 204 is less than a radial distance between the first outer axial portion 310 and the inner axial portion 324. In other words, the thickness of the annular disk 110 is less than a width of the annular disk 110. The inner axial portion 324 defines an inner diameter of the annular disk 110. The second outer axial portion 316 defines an outer diameter of the annular disk 110 that is substantially equal to a diameter of the channel 156. To increase the back pressure to a range of approximately 14 kPa to approximately 15 kPa, a ratio of the inner diameter to the outer diameter is in a range of approximately 39:50 to approximately 21:25.

As indicated above, FIG. 3 is provided as an example. Other examples may differ from what is described with regard to FIG. 3. For example, the number and arrangement of components may differ from that shown in FIG. 3. Thus, there may be additional components, fewer components, different components, differently shaped components, differently sized components, and/or differently arranged components than those shown in FIG. 3. For example, the outer curved portion 314 (and correspondingly, the convex portion of the mating surface 306) may have a different shape (e.g., a smaller radius of curvature, a beveled shape, or another shape that smoothly connects the outer radial portion 312 with the second outer axial portion 316).

In the description to follow, the annular disk 110 will be described in terms of a radially outward section and a radially inward section. It should be understood that the radially outward section is a section of the annular disk 110 that is radially outward of second outer axial portion 316, and the radially inward section is a section of the annular disk 110 that is radially inward of the second outer axial portion 316.

Figure 4:
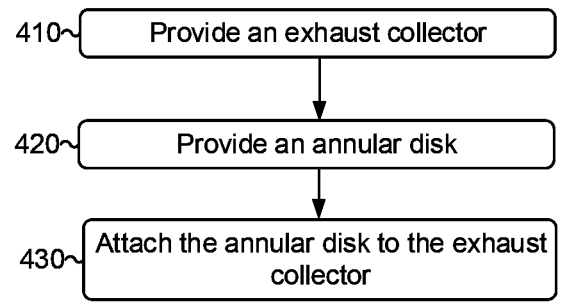
FIG. 4 is a flowchart of an exemplary method of assembling the system.

FIG. 4 is a flowchart of an exemplary method 400 of assembling the system 100. As shown in FIG. 4, method 400 may include providing an exhaust collector (block 410). The exhaust collector may include a wall including an inlet end and an outlet end that is opposite the inlet end. The inlet end may have a convex portion and may include an inlet having a second diameter. The outlet end may include an outlet that fluidly communicates with the inlet to define an exhaust channel. The exhaust collector may further include a flange circumferentially extending around the inlet end of the wall.

As further shown in FIG. 4, method 400 may include providing an annular disk (block 420). The annular disk may have a radially inward section and a radially outward section. The radially inward section of the annular disk may have a first diameter. A ratio of the first diameter to the second diameter may be in a range of approximately 39:50 to approximately 21:25. The radially outward section may have a concave portion. The annular disk may be made of a single, integral piece of iron.

As further shown in FIG. 4, method 400 may include attaching the annular disk to the exhaust collector (block 430). Attaching the annular disk may include attaching the radially outward section of the annular disk to the flange of the exhaust collector. Attaching the annular disk may further include tightening a clamp around an end of a bellows, the radially outward section of the annular disk, and the flange of the exhaust collector to secure the radially outward section of the annular disk between the end of the bellows and the flange of the exhaust collector. Attaching the annular disk may include aligning the concave portion with the convex portion.

In some implementations, method 400 may further include receiving, prior to providing the exhaust collector, the exhaust collector in an initial state. The exhaust collector, in the initial state, may include an initial wall having a first initial inlet end and an outlet end that is opposite the first initial inlet end. The first initial inlet end may have a first initial inlet, and the outlet end may have an outlet that fluidly communicates with the first initial inlet. The exhaust collector, in the initial state, may further include an initial flange circumferentially extending around the first initial inlet end. Method 400 may further include removing, prior to providing the exhaust collector, a portion of the initial wall and the initial flange to create the inlet end, the inlet, and the flange of the exhaust collector. The portion may have a geometry that is substantially congruent to a geometry of the radially outward section of the annular disk.

Although FIG. 4 shows example blocks of method 400, in some implementations, method 400 may include additional blocks, fewer blocks, different blocks, or differently arranged blocks than those depicted in FIG. 4. Additionally, or alternatively, two or more of the blocks of method 400 may be performed in parallel.

INDUSTRIAL APPLICABILITY

The annular disk 110 of the present disclosure is particularly applicable to a system or machine utilizing a turbocharger. For example, the system may be the system 100. The machine may be a transportation machine (e.g., a motor vehicle, a railed vehicle, a watercraft, and/or an aircraft), a generator, or another type of machine.

Due to the shape and arrangement of the annular disk 110, the annular disk 110 is configured to induce back pressure in the exhaust stream in a range of approximately 14 kPa to approximately 15 kPa. By inducing back pressure at such a level, the annular disk 110 decreases the pressure differential downstream of the turbocharger 102, which reduces the speed of the turbine wheel and the compressor wheel. As a result, the annular disk 110 may, at a low cost and with little manufacturing complexity, prevent damage to the turbocharger 102 and/or the engine and conserve resources that might otherwise have been consumed replacing and/or repairing components. Furthermore, by inducing the back pressure, the annular disk 110 may limit an amount of exhaust exiting cylinders of the engine and/or decrease downstream pressure of the exhaust stream. As a result, the annular disk 110 may decrease nitrous oxide emissions. Additionally, because the annular disk 110 is removably integrated into the system 100, the annular disk 110 allows for adjustability and replacement without being overly susceptible to loss. Furthermore, because the annular disk 110 has a relatively constant thickness and includes the first chamfer 326 and the second chamfer 328, the annular disk 110 has increased durability and is therefore configured to withstand forces from the exhaust stream while the annular disk 110 restricts the flow.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, as used herein, the terms "comprises," "comprising," "having," "including," or other variations thereof, are intended to cover non-exclusion, such that a process, method, article, or apparatus that comprises a list of elements does not include only those elements, but may include other elements not expressly listed. In addition, in this disclosure, relative terms, such as, for example, "about," "generally," "substantially," and "approximately" are used to indicate a possible variation of ±10% of the stated value, except where otherwise apparent to one of ordinary skill in the art from the context. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system comprising:
    a turbocharger having a compressor wheel, a turbine wheel, and a shaft connecting the compressor wheel to the turbine wheel;
    an exhaust collector;
    a bellows; and
    an annular disk extending into an exhaust passageway in a position downstream from the turbine wheel of the turbocharger,
        wherein the annular disk is configured to induce back pressure, and
        wherein the annular disk is between the exhaust collector and the bellows.

2. The system of claim 1, wherein the exhaust collector has a channel,
    the bellows connects the exhaust collector to the turbocharger,
    the bellows includes a hollow interior to guide an exhaust stream into the channel of the exhaust collector,
    the hollow interior and the channel together define the exhaust passageway, and
    the annular disk is clamped between an end of the exhaust collector and an end of the bellows.

3. The system of claim 2, wherein
    the exhaust collector includes a flange at the end of the exhaust collector, and
    a geometry of an outer section of the annular disk substantially mirrors a geometry of the flange.

4. The system of claim 2, wherein
    the end of the exhaust collector has a first radius of curvature, and
    an outer portion of the annular disk has a second radius of curvature that is substantially equal to the first radius of curvature.

5. The system of claim 1, wherein the annular disk comprises:
    a front surface having a front opening within a front plane;
    a rear surface having a rear opening within a rear plane that is substantially parallel to the front plane, wherein
        the rear opening has a diameter that is smaller than a diameter of the front opening, and
        the rear opening fluidly communicates with the front opening to define a bore for guiding an exhaust stream;
    an outer surface that connects the front surface to the rear surface, the outer surface including:
        an outer angled portion,
        an outer radial portion, and
        an outer axial portion extending between the outer angled portion and the outer radial portion; and
    an inner surface that connects the front surface to the rear surface, the inner surface including:
        an inner angled portion,
        an inner axial portion, and
        an inner radial portion extending between the inner angled portion and the inner axial portion.

6. The system of claim 1, wherein
    the annular disk has a first inner diameter,
    the exhaust passageway has a second inner diameter, and
    a ratio of the first inner diameter to the second inner diameter is in a range of approximately 39:50 to approximately 21:25.

7. The system of claim 1, wherein the annular disk has an inner surface that includes a first chamfer, a second chamfer, and an axial portion connecting the first chamfer to the second chamfer.

8. The system of claim 1, wherein the annular disk is configured to induce the back pressure in an exhaust stream in a range of approximately 14 kilopascals to approximately 15 kilopascals.

9. An annular disk for controlling speed of a turbocharger, the annular disk comprising:
    a front surface having a front opening within a front plane;
    a rear surface having a rear opening within a rear plane that is substantially parallel to the front plane, wherein
        the rear opening has a diameter that is smaller than a diameter of the front opening, and
        the rear opening fluidly communicates with the front opening to define a bore for guiding an exhaust stream flowing from the turbocharger to an exhaust outlet;
    an outer surface that connects the front surface to the rear surface, the outer surface including:
        an outer angled portion configured to secure the annular disk between bellows and an exhaust collector,
        an outer radial portion, and
        an outer axial portion extending between the outer angled portion and the outer radial portion; and
    an inner surface that connects the front surface to the rear surface, the inner surface including:
        an inner angled portion,
        an inner axial portion, and
        an inner radial portion extending between the inner angled portion and the inner axial portion and configured to obstruct a portion of the exhaust stream to increase back pressure.

10. The annular disk of claim 9, wherein an axial distance between the front surface and the outer radial portion is substantially equal to an axial distance between the inner radial portion and the rear surface.

11. The annular disk of claim 9, wherein an axial distance between the front surface and the rear surface is less than a radial distance between the outer axial portion and the inner axial portion.

12. The annular disk of claim 9, wherein
    the outer axial portion is a first outer axial portion, and
    the outer surface further includes:
        a second outer axial portion that is substantially parallel to the first outer axial portion, and
        an outer curved portion that connects the outer radial portion to the second outer axial portion,
            wherein the outer radial portion, the outer curved portion, and the second outer axial portion together define a seat that is configured to receive a portion of an end of an exhaust collector.

13. The annular disk of claim 12, wherein
    the inner axial portion defines an inner diameter of the annular disk,
    the second outer axial portion defines an outer diameter of the annular disk, and a ratio of the inner diameter to the outer diameter is in a range of approximately 39:50 to approximately 21:25.

14. The annular disk of claim 9, wherein the inner surface further includes:
   a first chamfer connecting the inner radial portion to the inner axial portion, and
   a second chamfer connecting the inner axial portion to the rear surface.

15. The annular disk of claim 9, wherein the outer angled portion and the inner angled portion extend from the front surface of the annular disk in directions toward the rear plane.

16. A method of assembling a system, the method comprising:
   providing an exhaust collector, the exhaust collector including:
      a wall including an inlet end and an outlet end that is opposite the inlet end, wherein
         the inlet end includes an inlet, and
         the outlet end includes an outlet that fluidly communicates with the inlet to define an exhaust channel; and
      a flange circumferentially extending around the inlet end of the wall;
   providing an annular disk, the annular disk having a radially inward section and a radially outward section; and
   attaching the radially outward section of the annular disk to the flange of the exhaust collector,
      wherein attaching the radially outward section comprises:
         tightening a clamp around an end of a bellows, the radially outward section of the annular disk, and the flange of the exhaust collector to secure the radially outward section of the annular disk between the end of the bellows and the flange of the exhaust collector.

17. The method of claim 16, wherein the method, prior to providing the exhaust collector, further comprises:
   receiving the exhaust collector in an initial state, wherein the exhaust collector, in the initial state, includes:
      an initial wall having an initial inlet end and the outlet end that is opposite the initial inlet end, the initial inlet end having an initial inlet, and the outlet end having the outlet that fluidly communicates with the initial inlet; and
      an initial flange circumferentially extending around the initial inlet end; and
   removing a portion of the initial wall and the initial flange to create the inlet end, the inlet, and the flange of the exhaust collector,
      wherein the portion has a geometry that is substantially congruent to a geometry of the radially outward section of the annular disk.

18. The method of claim 16, wherein
the radially inward section of the annular disk has a first diameter,
the inlet has a second diameter, and
a ratio of the first diameter to the second diameter is in a range of approximately 39:50 to approximately 21:25.

19. The method of claim 16, wherein
the radially outward section of the annular disk has a concave portion,
the inlet end of the exhaust collector has a convex portion, and
attaching the radially outward section further comprises aligning the concave portion with the convex portion.

20. The method of claim 16, wherein the annular disk is made of a single, integral piece of iron.

* * * * *